United States Patent
Kim et al.

(10) Patent No.: US 10,581,073 B2
(45) Date of Patent: Mar. 3, 2020

(54) SECONDARY BATTERY INCLUDING HIGH-CAPACITY NEGATIVE ELECTRODE AND METHOD OF MANUFACTURING THE SAME

(71) Applicant: LG Chem, Ltd., Seoul (KR)

(72) Inventors: Kyoung Ho Kim, Daejeon (KR); Chae Ah Kim, Daejeon (KR); Jooyong Song, Daejeon (KR); Hye Youn Lee, Daejeon (KR); Hoe Jin Hah, Daejeon (KR)

(73) Assignee: LG Chem, Ltd. (KR)

( * ) Notice: Subject to any disclaimer, the term of this patent is extended or adjusted under 35 U.S.C. 154(b) by 169 days.

(21) Appl. No.: 15/513,056

(22) PCT Filed: Jan. 28, 2016

(86) PCT No.: PCT/KR2016/000917
§ 371 (c)(1),
(2) Date: Mar. 21, 2017

(87) PCT Pub. No.: WO2016/126046
PCT Pub. Date: Aug. 11, 2016

(65) Prior Publication Data
US 2017/0338480 A1    Nov. 23, 2017

(30) Foreign Application Priority Data
Feb. 2, 2015  (KR) .................. 10-2015-0015891

(51) Int. Cl.
| | |
|---|---|
| H01M 4/38 | (2006.01) |
| H01M 4/485 | (2010.01) |
| H01M 4/1393 | (2010.01) |
| H01M 4/1395 | (2010.01) |
| H01M 4/1391 | (2010.01) |
| H01M 4/66 | (2006.01) |
| H01M 4/04 | (2006.01) |
| H01M 10/04 | (2006.01) |
| H01M 4/58 | (2010.01) |
| H01M 4/583 | (2010.01) |
| H01M 4/36 | (2006.01) |
| C01B 33/00 | (2006.01) |
| C01D 15/00 | (2006.01) |
| H01M 10/0525 | (2010.01) |
| H01M 10/056 | (2010.01) |

(52) U.S. Cl.
CPC ......... *H01M 4/386* (2013.01); *H01M 4/0461* (2013.01); *H01M 4/1391* (2013.01); *H01M 4/1393* (2013.01); *H01M 4/1395* (2013.01); *H01M 4/485* (2013.01); *H01M 4/5825* (2013.01); *H01M 4/66* (2013.01); *H01M 4/667* (2013.01); *H01M 10/04* (2013.01); *C01B 33/00* (2013.01); *C01D 15/00* (2013.01); *H01M 4/364* (2013.01); *H01M 4/5835* (2013.01); *H01M 10/056* (2013.01); *H01M 10/0525* (2013.01)

(58) Field of Classification Search
None
See application file for complete search history.

(56) References Cited

U.S. PATENT DOCUMENTS

| | | |
|---|---|---|
| 2005/0130043 A1 | 6/2005 | Gao et al. |
| 2012/0082891 A1 | 4/2012 | Ahn |
| 2012/0105007 A1 | 5/2012 | Amiruddin et al. |
| 2013/0162216 A1* | 6/2013 | Zhamu ................ H01G 11/06 320/130 |
| 2013/0260254 A1 | 10/2013 | Kren et al. |
| 2013/0327648 A1 | 12/2013 | Grant et al. |
| 2014/0335400 A1 | 11/2014 | Cherng et al. |
| 2016/0285091 A1 | 9/2016 | Iriyama et al. |

FOREIGN PATENT DOCUMENTS

| | | |
|---|---|---|
| EP | 0752727 A1 | 1/1997 |
| EP | 2437330 A1 | 4/2012 |
| JP | H10308212 A | 11/1998 |
| JP | 2009043624 A | 2/2009 |
| JP | 2010160983 A | 7/2010 |
| JP | 2011060520 A | 3/2011 |
| KR | 1019990086308 A | 6/2001 |
| KR | 20060056969 A | 5/2006 |

(Continued)

OTHER PUBLICATIONS

Extended European Search Report for Application No. EP16746787.7 dated Dec. 20, 2017.
Shu et al., Comparative study on surface behaviors of copper current collector in electrolyte for lithium-ion batteries, Electrochimica Acta, vol. 56, Issue 8, pp. 3006-3014, Mar. 2011.
International Search Report for Application No. PCT/KR2016/000917 dated Apr. 29, 2016.

*Primary Examiner* — Ladan Mohaddes
(74) *Attorney, Agent, or Firm* — Lerner, David, Littenberg, Krumholz & Mentlik, LLP

(57) ABSTRACT

Disclosed are a secondary battery comprising a negative electrode composed of two or more negative electrode plates and a method of manufacturing the secondary battery, wherein each of the negative electrode plates includes a lithium by-product layer formed through pre-lithiation reaction on a negative electrode current collector coated with a negative electrode active material, wherein an inorganic substance layer is formed on a negative electrode tab that is extended from an end at one side of the negative electrode current collector and is composed of an active material-non-coated portion not coated with the negative electrode active material, and negative electrode tabs of the negative electrode plates are electrically connected with one negative electrode lead to form a negative electrode terminal.

16 Claims, 1 Drawing Sheet

(56) References Cited

FOREIGN PATENT DOCUMENTS

| KR | 20060068426 A | 6/2006 |
|----|---------------|--------|
| KR | 20130108616 A | 10/2013 |
| KR | 101357904 B1 | 2/2014 |
| KR | 20140106645 A | 9/2014 |
| WO | 2012158608 A1 | 11/2012 |
| WO | 2014077113 A1 | 5/2014 |

* cited by examiner

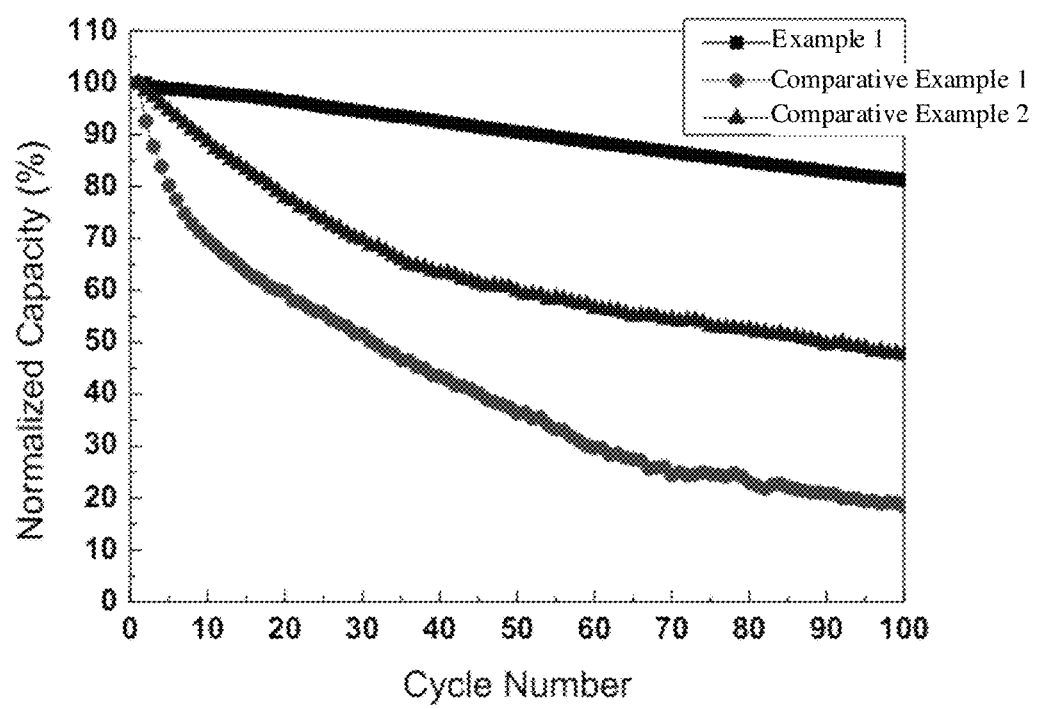

SECONDARY BATTERY INCLUDING HIGH-CAPACITY NEGATIVE ELECTRODE AND METHOD OF MANUFACTURING THE SAME

CROSS-REFERENCE TO RELATED APPLICATIONS

The present application is a national phase entry under 35 U.S.C. § 371 of International Application No. PCT/KR2016/00917 filed Jan. 28, 2016, which claims the benefit of Korean Patent Application No. 10-2015-0015891 filed on Feb. 2, 2015 with the Korean Intellectual Property Office, the disclosures of which are herein incorporated by reference.

TECHNICAL FIELD

The present invention relates to a secondary battery including a high-capacity negative electrode and a method of manufacturing the same. More particularly, the present invention relates to a secondary battery including a negative electrode that includes a pre-lithiated negative electrode current collector, and a negative electrode tab, on which an inorganic substance layer is formed, to provide high capacity and, accordingly, enhanced lifespan and rate characteristics and increased production efficiency, and a method of manufacturing the same.

BACKGROUND ART

As technological development of various devices and demand therefor continue to increase, demand for secondary batteries as energy sources is rapidly increasing. Among these secondary batteries, lithium secondary batteries which have high energy density and voltage and exhibit long lifespan and low self-discharge rate are commercially available and widely used.

In such lithium secondary batteries, a lithium-containing cobalt oxide ($LiCoO_2$) with a layered crystal structure, $LiMnO_2$ with a layered crystal structure, a lithium-containing manganese oxide such as $LiMn_2O_4$ with a spinel crystal structure, or a lithium-containing nickel oxide such as $LiNiO_2$ is generally used as a positive electrode active material. In addition, a carbon-based material is mainly used as a negative electrode active material thereof. Recently, demand for high-capacity secondary batteries is increasing, and thus, use of a silicon-based material or a mixture including a silicon oxide-based material having effective capacity 10-folds or higher than that of a carbon-based material is under consideration.

However, lithium secondary batteries have various problems. For example, some lithium secondary batteries have problems related with characteristics in manufacturing and operating a negative electrode.

For example, in an initial charge and discharge process (activation process) of a carbon-based negative electrode active material, a solid electrolyte interface (SEI) layer is formed on a surface of the negative electrode active material and, accordingly, initial irreversibility is induced. In addition, an SEI layer is collapsed in a continuous charge and discharge process and an electrolyte solution is depleted in a regeneration process, whereby a battery capacity is reduced.

Furthermore, in the case of a silicon-based material, high capacity is exhibited, but a volumetric expansion ratio thereof is 300% or more with increasing cycle count. Accordingly, resistance and side reaction of an electrolyte solution may be increased, and thus, problems due to SEI layer formation, such as electrode structure damage, may be intensified.

Since a silicon oxide-based material has a lower volumetric expansion ratio and superior fatigue life characteristics, compared to a silicon-based material, application thereof may be considered. However, the silicon oxide-based material also has problems such as SEI layer formation during charging and a high frequency of initial irreversibility to $Li_2O$ due to oxygen present in an active material.

So as to address such a problem, research into a method to change oxygen, which is present in a silicon oxide-based material, causing high irreversible capacity into a lithium oxide through pre-lithiation of the silicon oxide-based material is actively underway. Such a method can increase lifespan by reducing initial irreversibility of the silicon oxide-based material. However, when this method is used, large amounts of by-products are generated in a process in which a silicon oxide-based material is pre-lithiated with a lithium source and most lithium oxide is generated on a surface of the silicon oxide-based material. Therefore, there is limitation in reducing irreversibility.

Recently, so as to address such problems, attempts to completely decrease initial irreversibility and, thus, enhance cycle characteristics by feeding a negative electrode into a solution containing a lithium source, applying current to the negative electrode, and, accordingly, allowing pre-lithiation reaction have been made. However, when a lithium layer is formed on the negative electrode through application of current, a lithium by-product is also formed at an active material-non-coated portion of the negative electrode, which was not coated with a negative electrode active material. Accordingly, it is difficult to weld the active material-non-coated portion of the negative electrode to a negative electrode lead, whereby it is impossible to manufacture a cell.

Therefore, there is an urgent need for technology to manufacture a secondary battery with high energy density while addressing such problems.

DISCLOSURE

Technical Problem

Therefore, the present invention has been made to solve the above and other technical problems that have yet to be resolved.

It is an object of the present invention to provide a secondary battery having enhanced lifespan and rate characteristics by, while using a high-capacity negative electrode active material, using a pre-lithiated negative electrode current collector to minimize an irreversibility according to application of the negative electrode active material, and a method of manufacturing the secondary battery.

It is another object of the present invention to provide a secondary battery with greatly enhanced production efficiency by facilitating connection of a negative electrode tab to a negative electrode lead through application of the negative electrode tab on which an inorganic substance layer is formed, and a method of manufacturing the secondary battery.

Technical Solution

In accordance with an aspect of the present invention, the above and other objects can be accomplished by the provision of a secondary battery, including a negative electrode composed of two or more negative electrode plates, wherein each of the negative electrode plates includes a lithium by-product layer formed through pre-lithiation reaction on a negative electrode current collector coated with a negative electrode active material, wherein an inorganic substance layer is formed on a negative electrode tab that is extended from an end at one side of the negative electrode current collector and is composed of an active material-non-coated portion not coated with the negative electrode active material, and negative electrode tabs of the negative electrode plates are electrically connected with one negative electrode lead to form a negative electrode terminal.

As described above, when a high-capacity negative electrode active material is used, irreversibility of a negative electrode may be intensified due to formation of an SEI layer. So as to address this problem, irreversibility may be prevented by previously inserting lithium and thus allowing pre-lithiation. However, in this case, a lithium by-product layer is also formed on a surface of a negative electrode tab that is not coated with a negative electrode active material, thereby hindering connection of negative electrode tabs to a negative electrode lead. Accordingly, it is impossible to manufacture a secondary battery.

Accordingly, inventors of the present invention confirmed that, when an inorganic substance layer is previously formed on a negative electrode tab of a negative electrode plate, the resistance of a portion coated with the inorganic substance is increased and thus current does not well flow at the portion upon pre-lithiating even in a lithium-based solvent. Accordingly, inventors of the present invention confirmed that lithium is not easily deposited and thus a lithium by-product layer is not formed.

Therefore, the present invention may provide a secondary battery having increased lifespan and rate characteristics as well as increased production efficiency by previously forming an inorganic substance layer on the negative electrode tab of the negative electrode plate and thus pre-lithiating only the negative electrode portion coated with the negative electrode active material of the negative electrode plate, thereby increasing coupling force between the negative electrode tabs and the negative electrode lead.

In the present invention, the negative electrode active material may include, as a silicon-based material, one or more selected from the group consisting of, for example, silicon (Si), an alloy of silicon, $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ where $0.5 \leq v \leq 1.2$, and LiSiO. The negative electrode active material may include particularly $SiO_v$, where $0.5 \leq v \leq 1.2$, more particularly SiO which has the smallest volumetric expansion among the silicon-based materials and superior cycle characteristics.

When such SiO is used as a negative electrode active material, irreversibility increases due to oxygen present in the active material and capacity may be rapidly decreased with increasing cycle count. However, the present invention may reduce irreversibility by generating lithium oxide, which is formed by previously reacting oxygen and lithium, in the active material through pre-lithiation, and capacity reduction with increasing cycle count.

The negative electrode active material may further include, other than the aforementioned silicon-based materials, a carbon-based material.

The carbon-based material may be any carbon-based material available in the art. The carbon-based material may be one or more selected from the group consisting of, for example, graphite, artificial graphite, mesocarbon microbead (MCMB), carbon fiber, carbon black, acetylene black, and Ketjen black. Particularly, the carbon-based material may be graphite.

When the negative electrode active material includes a silicon-based material and a carbon-based material, the silicon-based material may be included in an amount of 80% by weight or less, particularly 50% by weight or less based on the total weight of the negative electrode active material. More particularly, the silicon-based material may be included in an amount of 30% by weight or less. More particularly, the silicon-based material may be included in an amount of 15% by weight or less. When the silicon-based material is mixed with the carbon-based material and, in this case, the amount of the silicon-based material is too small, it is impossible to anticipate desired capacity increase. When the amount of the silicon-based material is too large, volumetric expansion thereof may be intensified, compared to the carbon-based material.

In the present invention, the lithium by-product formed on the negative electrode current collector coated with the negative electrode active material includes lithium. For example, the lithium by-product may be one or more selected from the group consisting of lithium metal such as Li, lithium oxide such as $Li_2O$ or $Li_2O$, lithium chloride such as LiCl, and an inorganic compound such as $LiCl_4$. Particularly, the lithium by-product may be $Li_2O$.

Although the thickness of the lithium by-product layer depends upon a pre-lithiation condition, the thickness may be 0.01 μm to 1 μm, particularly 0.05 μm to 0.5 μm, more particularly 0.1 μm to 0.3 μm.

When the thickness of the lithium by-product layer is less than 0.01 μm, the negative electrode is hardly pre-lithiated. Accordingly, irreversibility of the negative electrode active material might not be sufficiently prevented and thus desired effects might not be obtained. When the thickness of the lithium by-product layer is greater than 1 μm, internal resistance of the negative electrode is unexpectedly increased.

In addition, an inorganic substance formed on the negative electrode tab composed of the active material-non-coated portion, which is not coated with the negative electrode active material, may be one or more selected from the group consisting of $SiO_2$, $TiO_2$, $Al_2O_3$, $ZrO_2$, $SnO_2$, $CeO_2$, MgO, CaO, ZnO, $Y_2O_3$, $Pb(Zr,Ti)O_3$(PZT), $Pb_{1-x}La_xZr_{1-y}TiyO_3$ (PLZT) where $0<x<1$ and $0<y<1$, $Pb(Mg_{1/3}Nb_{2/3})O_3$—$PbTiO_3$(PMN-PT), $BaTiO_3$, hafnia($HfO_2$), $SrTiO_3$, and a mixture of two or more thereof.

As needed, within a range within which effects of the present invention are not decreased, the inorganic substance may be a mixture including one or more selected from polymer resins, e.g., polyethylene, polypropylene, poly (ether imide), polyacetal, polysulfone, polyetheretherketone, polyester, polyamide, an ethylene-vinyl acetate copolymer, polystyrene, polytetrafluoroethylene, polysiloxane, and polyimide, a copolymer thereof, and a mixture thereof.

The thickness of the inorganic substance layer may be 1 nm to 10 μm, particularly 10 nm to 5 μm, more particularly 100 nm to 2 μm.

When the thickness of the inorganic substance layer is less than 1 nm, the amount of an inorganic substance is not sufficient, and thus, the lithium by-product layer may be formed at the negative electrode tab during pre-lithiation. When the thickness of the inorganic substance layer is greater than 10 μm, it is difficult to weld between the negative electrode tabs and the negative electrode lead, and thus, it may be hard to accomplish electrical connection thereof.

The inorganic substance layer formed on the negative electrode tab composed of the active material-non-coated portion may be particularly formed on the whole of the negative electrode tab.

The present invention provides a method of manufacturing the secondary battery, the method including:

(a) coating the negative electrode active material on the negative electrode current collector portion, except for the portion corresponding to the negative electrode tab, of the metal sheet and then coating the negative electrode tab composed of the active material-non-coated portion that is not coated with the negative electrode active material with the inorganic substance;

(b) pre-lithiating by feeding the metal sheet manufactured through the coating (a) into the lithium-based solvent and then applying current thereto;

(c) cutting the metal sheet manufactured through the pre-lithiating (b) into the shape of the negative electrode plate that includes the negative electrode current collector portion and the negative electrode tab; and (d) forming the negative electrode terminal by stacking two or more negative electrode plates manufactured through the cutting (c) and then electrically connecting the negative electrode tabs to the negative electrode lead.

In the coating (a), the metal sheet may be extended in width and length directions thereof so as to cut a plurality of negative electrodes. The metal sheet may be made of, for example, stainless steel, aluminum, nickel, titanium, sintered carbon, or copper or stainless steel surface-treated with carbon, nickel, titanium, or silver, or an aluminum-cadmium alloy. Particularly, the metal sheet may be made of copper.

The pre-lithiating (b) may be performed by, for example, disposing the metal sheet between two opposite rolls and allowing this metal sheet to pass through a chamber containing a lithium-based solvent.

The lithium-based solvent may be one or a mixture of two or more selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, and Li$_3$PO$_4$—Li$_2$S—SiS$_2$. However, the present invention is not limited to these materials.

The pre-lithiating may be performed by applying a current of 10 mA to 10 A for 0.1 hours to 12 hours, particularly a current of 100 mA to 5 A for 1 hour to 10 hours.

Current levels and time conditions of the pre-lithiating are optimal conditions to perform desired pre-lithiation. When these conditions are outside the ranges, pre-lithiation is hardly performed, or the thickness of the lithium by-product layer increases. Accordingly, resistance increases and time taken for the pre-lithiation is extended, thereby decreasing productivity.

Even when the pre-lithiating (b) is performed in a lithium-based solvent, a lithium by-product layer is not easily formed because current does not easily flow due to high resistance of the negative electrode tab coated with the inorganic substance in the coating (a).

Therefore, in the cutting (c), the negative electrode current collector portion may include the lithium by-product layer formed through the pre-lithiation.

In addition, a process of stabilizing the metal sheet at 30° C. to 100° C. for 6 hours to 12 hours, particularly at 40° C. to 100° C. for 6 hours to 10 hours may be additionally included between the pre-lithiating (b) and the cutting (c).

When a stabilization process is additionally performed under the conditions after pre-lithiating the metal sheet, the lithium oxide layer may be sufficiently formed on the negative electrode current collector, which is coated with the negative electrode active material, of the metal sheet.

In the forming (d), since the inorganic substance layer is previously formed on the negative electrode tab which is not coated with the negative electrode active material, generation of the lithium by-product layer due to the pre-lithiation may be prevented. Accordingly, connection of the negative electrode tabs to the negative electrode lead may be easily accomplished through welding.

In general, laser welding is non-uniformly performed depending upon a surface state, and resistance welding provides high binding force but exhibits great deformation at a connected part due to exposure to high temperature. Accordingly, since welding is performed using frictional heat in the present invention, surface deformation of the connected part is decreased and ultrasonic welding which allows uniform welding regardless of a state of the connected surface may be performed.

The principle of binding through such ultrasonic welding is as follows. Welding is rapidly performed while vibrational energy is converted into heat energy due to friction at interfaces between negative electrode tabs and between a negative electrode tab and a negative electrode lead using high frequency vibration generated by ultrasonic waves of about 20 kHz. Electrode tab surfaces, which are newly exposed by partial plastic deformation of coating layers of the interfaces, are adhered to each other by friction which is concomitant with vibration. In addition, diffusion and recrystallization of atoms are promoted by partial temperature increase due to frictional heat, and thus, a solid pressure-welded part may be formed.

In addition, even when the inorganic substance layer is formed on the negative electrode tab, the negative electrode tab may be easily welded with the negative electrode lead due to frictional heat generated by application of ultrasonic waves.

Such a secondary battery may be a lithium battery as an embodiment, but the present invention is not limited thereto.

The lithium secondary battery includes a positive electrode, which is prepared by coating a mixture of a positive electrode active material, a conductive material, and a binder on a positive electrode current collector and drying and pressing the coated positive electrode current collector, and a negative electrode prepared using the same method as that used to manufacture the positive electrode. In this case, the mixture may further include a filler as desired.

The positive electrode current collector is generally fabricated to a thickness of 3 to 500 μm. The positive electrode current collector is not particularly limited so long as it does not cause chemical changes in the fabricated lithium secondary battery and has high conductivity. For example, the positive electrode current collector may be made of stainless steel, aluminum, nickel, titanium, sintered carbon, aluminum or stainless steel surface-treated with carbon, nickel, titanium, or silver, or the like. The positive electrode current collector may have fine irregularities at a surface thereof to increase adhesion between the positive electrode active material and the positive electrode current collector. In addition, the positive electrode current collector may be used in any of various forms including films, sheets, foils, nets, porous structures, foams, and non-woven fabrics.

The lithium secondary battery may include, as a positive electrode active material, lithium nickel oxides ($LiNiO_2$); lithium manganese oxides such as compounds of Formula $Li_{1+x}Mn_{2-x}O_4$ where $0 \leq x \leq 0.33$, $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides of Formula $LiNi_{1-x}M_xO_2$ where M=Co, Mn, Al, Cu, Fe, Mg, B, or Ga, and $0.01 \leq x \leq 0.3$; lithium manganese composite oxides of Formula $LiMn_{2-x}M_xO_2$ where M=Co, Ni, Fe, Cr, Zn, or Ta, and $0.01 \leq x \leq 0.1$), or Formula $Li_2Mn_3MO_8$ where M=Fe, Co, Ni, Cu, or Zn; spinel-structure lithium manganese composite oxides of Formula $LiNi_xMn_{2-x}O_4$ where x=0.01 to 0.6; $LiMn_2O_4$ in which some of the Li atoms are substituted with alkaline earth metal ions; disulfide compounds; $Fe_2(MoO_4)_3$; and the like.

The conductive material is generally added in an amount of 1 to 50 wt % with respect to the total weight of a mixture including a positive electrode active material. Such a conductive material is not specifically limited so long as it does not cause chemical changes in the fabricated battery and has conductivity. For example, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide whiskers and potassium titanate whiskers; conductive metal oxides such as titanium oxide; conductive materials such as polyphenylene derivatives; and the like may be used.

The binder is a component assisting in binding between an active material and the conductive material and in binding of the active material to a current collector. The binder is typically added in an amount of 1 to 50 wt % based on the total weight of the mixture including the positive electrode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butylene rubber, fluorine rubber, and various copolymers.

The filler is optionally used as a component to inhibit positive electrode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The negative electrode current collector is typically fabricated to a thickness of 3 to 500 μm.

The lithium secondary battery may have a structure in which an electrode assembly, which includes a positive electrode, a negative electrode, and a separator disposed between the positive electrode and the negative electrode, is impregnated with a lithium salt-containing electrolyte.

The separator is disposed between the positive electrode and the negative electrode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin-based polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing electrolyte solution is composed of a non-aqueous solvent and a lithium salt. The lithium salt is a material that is readily soluble in the non-aqueous electrolyte and examples thereof include, but are not limited to, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imides.

The non-aqueous solvent is not specifically limited so long as known in the art, and may be one or more selected from the group consisting of, for example, ethylene carbonate (EC), propylene carbonate (PC), butylene carbonate (BC), dimethyl carbonate (DMC), diethyl carbonate (DEC), ethylmethyl carbonate (EMC), methyl propionate (MP) and ethyl propionate (EP).

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas, and propene sultone (PRS) and the like may be further included.

In a preferred embodiment, the lithium salt-containing non-aqueous electrolyte may be prepared by adding a lithium salt such as $LiPF_6$, $LiClO_4$, $LiBF_4$, $LiN(SO_2CF_3)_2$, or the like to a high dielectric solvent.

The present invention also provides a device including the secondary battery as a power source. The device may be selected from mobile phones, portable computers, smartphones, tablet PCs, smart pads, netbook computers, light electric vehicles (LEVs), light electric vehicles, hybrid electric vehicles, plug-in hybrid electric vehicles, power storage devices, and the like.

The structures of these devices and methods of manufacturing the devices are known in the art, and thus, detailed descriptions thereof are omitted.

BRIEF DESCRIPTION OF THE DRAWINGS

The above and other objects, features and other advantages of the present invention will be more clearly understood from the following detailed description taken in conjunction with the accompanying drawing, in which:

FIG. 1 is graphs showing lifespan characteristics of lithium batteries according to Example 1 and Comparative Examples 1 and 2, measured in Experimental Example 2.

MODE FOR INVENTION

Now, the present invention will be described in more detail with reference to the following examples. These examples are provided only for illustration of the present invention and should not be construed as limiting the scope and spirit of the present invention.

Example 1

1-1) Manufacture of Negative Electrode Plate

A negative electrode slurry, which was prepared by adding 92% by weight of a negative electrode active material including SiO and graphite in a weight ratio of 30:70, 3% by weight of Super-P as a conductive material, 3.5% by weight of SBR as a binder, and 1.5% by weight of CMC as a thickener to $H_2O$ as a solvent, was coated on a negative electrode current collector portion, except for a portion corresponding to a negative electrode tab, of a copper sheet to a thickness of 50 μm, followed by pressing. Subsequently, the negative electrode tab, which was composed of the active material-non-coated portion that was not coated with the negative electrode mixture, was coated with $Al_2O_3$ to a thickness of 0.2 μm.

This resultant copper sheet was fed into a non-aqueous EC/EMC-based electrolyte solution containing a LiCl salt and a lithium salt of 1 M $LiPF_6$ and then a current of 100 mA was applied thereto for one hour, whereby the copper sheet was pre-lithiated as much as an irreversible amount.

Subsequently, the metal sheet was cut into the shape of a negative electrode plate including the coated negative electrode portion and the negative electrode tab.

1-2. Manufacture of Positive Electrode Plate $Li(Ni_{0.8}Mn_{0.1}Co_{0.1})O_2$ was used as a positive electrode active material. 94% by weight of $Li(Ni_{0.8}Mn_{0.1}Co_{0.1})O_2$, 3.5% by weight of Super-P as a conductive material, and 2.5% by weight of PVdF as a binder were added to NMP as a solvent to prepare a positive electrode slurry. The prepared positive electrode slurry was coated on an aluminum foil to a thickness of 80 μm, followed by pressing and drying. As a result, a positive electrode plate was manufactured.

1-3. Manufacture of Lithium Battery

A porous separator (Celgard™) was disposed between the manufactured positive electrode plate and negative electrode plate. Positive electrode tabs and negative electrode tabs were gathered and arranged, and then subjected to ultrasonic welding to be respectively connected to a positive electrode lead and a negative electrode lead. Subsequently, a non-aqueous EC/EMC-based electrolyte solution including containing 1 M $LiPF_6$ was added thereto, thereby manufacturing a lithium battery.

Comparative Example 1

A lithium battery was manufactured in the same manner as in Example 1, except that an active material-non-coated portion of a negative electrode was not coated with an inorganic substance upon manufacturing of a negative electrode plate.

Comparative Example 2

A lithium battery was manufactured in the same manner as in Example 1, except that pre-lithiation reaction was not performed upon manufacture of a negative electrode plate.

Experimental Example 1

Rate characteristics of lithium secondary batteries manufactured according to Example 1 and Comparative Examples 1 and 2 were measured. To measure rate characteristics, charging/discharging was carried out at 25°C under a voltage of 2.5V to 4.3 V. In particular, charging was performed up to 67.5 mA in a 0.1 C constant current/constant voltage (CC/CV) charging manner and discharging was performed under a cut-off condition of 2.5 V in a 0.1 C, 0.5 C, and 1 C constant current (CC) discharging manner. 0.5 C and 1 C discharge efficiencies with respect to 0.1 C discharge capacity are summarized in Table 1.

TABLE 1

|  | 0.1 C discharge efficiency | 0.5 C discharge efficiency | 2 C discharge efficiency |
|---|---|---|---|
| Example 1 | 100% | 91.2% | 81.3% |
| Comparative Example 1 | 100% | 70.8% | 37.7% |
| Comparative Example 2 | 100% | 89.5% | 73.9% |

As shown in Table 1, it can be confirmed that the battery according to Example 1, wherein the active material-non-coated negative electrode portion was coated with the inorganic substance and pre-lithiated, exhibits superior rate performance to the battery according to Comparative Example 1, wherein the active material-non-coated negative electrode portion was not coated with the inorganic substance and was pre-lithiated.

This occurs because, when the active material-non-coated negative electrode portion is not coated with the inorganic substance, the active material-non-coated negative electrode portion is not welded with the negative electrode lead due to lithium by-products generated during pre-lithiation, or rate performance is deteriorated due to high contact resistance with the negative electrode lead.

Experimental Example 2

Lifespan characteristics of lithium secondary batteries manufactured according to Example 1 and Comparative Examples 1 and 2 were measured. So as to measure lifespan characteristics, charging was performed up to 67.5 mA at 25°C in a charging manner of constant current/constant voltage (CC/CV) of 0.5 C and 4.3 V. Discharging in a constant current (CC) discharge manner under a cut-off condition of 0.5 C and 2.5 V was performed 100 times. Results are summarized in FIG. 1.

As shown in FIG. 1, it can be confirmed that the battery of Example 1 manufactured by coating the active material-non-coated negative electrode portion with the inorganic substance and pre-lithiating exhibits superior lifespan, compared to the battery of Comparative Example 1, wherein the active material-non-coated negative electrode portion was not coated with the inorganic substance and was pre-lithiated, and the battery of Comparative Example 2, wherein the negative electrode was not pre-lithiated.

This occurs because the battery of Comparative Example 1 in which the active material-non-coated negative electrode portion was not coated with the inorganic substance, exhibits high resistance at the negative electrode lead, and decreased lifespan due to side-reaction of the lithium by-products. In addition, this occurs because, in the case of the battery of Comparative Example 2 in which the negative electrode was not pre-lithiated, Li is greatly consumed due to high irreversible capacity and great volumetric expansion, and thus, cycle lifespan is decreased.

INDUSTRIAL APPLICABILITY

Since a secondary battery according to the present invention can minimize irreversibility through pre-lithiation reaction using a high-capacity negative electrode active material, lifespan and rate characteristics thereof can be enhanced.

In addition, since an inorganic substance layer is previously formed on a negative electrode tab and then the pre-lithiation reaction is performed in a lithium-based solvent, a lithium by-product layer cannot be formed on the negative electrode tab. Accordingly, negative electrode tabs can be easily connected to a negative electrode lead, and thus, production efficiency can be enhanced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery, comprising a negative electrode composed of two or more negative electrode plates,
   wherein each of the negative electrode plates comprises a lithium by-product layer formed through pre-lithiation reaction on a negative electrode current collector coated with a negative electrode active material,
   wherein an inorganic substance layer is formed on a negative electrode tab that is extended from an end at one side of the negative electrode current collector and is composed of an active material-non-coated portion not coated with the negative electrode active material, and
   negative electrode tabs of the negative electrode plates are electrically connected with one negative electrode lead to form a negative electrode terminal, wherein the inorganic substance is one or more selected from the group consisting of $SiO_2$ $TiO_2$ $Al_2O_3$, $ZrO_2$, $SnO_2$, $CeO_2$, MgO, CaO, ZnO, $Y_2O_3$, $Pb(Zr,Ti)O_3$(PZT), $Pb_{1-x}La_xZr_{1-y}Ti_yO_3$(PLZT) where $0<x<1$ and $0<y<1$, $Pb(Mg_{1/3}Nb_{2/3})O_3$—$PbTiO_3$(PMN—PT), $BaTiO_3$, hafnia($HfO_2$), $SrTiO_3$, and a mixture of two or more thereof.

2. The secondary battery according to claim 1, wherein the negative electrode active material is one or more selected from the group consisting of silicon (Si), an alloy of silicon, $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ where $0.5 \leq v \leq 1.2$, and LiSiO.

3. The secondary battery according to claim 1, wherein the negative electrode active material comprises $SiO_v$ where $0.5 \leq v \leq 1.2$.

4. The secondary battery according to claim 1, wherein the lithium by-products are one or more selected from the group consisting of Li, $Li_2O$, $Li_2CO_3$, LiCl, and $LiClO_4$.

5. The secondary battery according to claim 1, wherein a thickness of the lithium by-product layer is 0.01 μm to 1 μm.

6. The secondary battery according to claim 1, wherein a thickness of the inorganic substance layer is 1 nm to 10 μm.

7. A method of manufacturing the secondary battery according to claim 1, the method comprising:
   coating a negative electrode active material on a negative electrode current collector portion, except for a portion corresponding to a negative electrode tab, of a metal sheet and then coating the negative electrode tab composed of the active material-non-coated portion that is not coated with the negative electrode active material with an inorganic substance;
   pre-lithiating by feeding the metal sheet manufactured through the coating into a lithium-based solvent and then applying current thereto;
   cutting the metal sheet manufactured through the pre-lithiating into a shape of a negative electrode plate that comprises the negative electrode current collector portion and the negative electrode tab; and
   forming a negative electrode terminal by stacking two or more negative electrode plates manufactured through the cutting and then electrically coupling the negative electrode tabs with a negative electrode lead, wherein the inorganic substance is one or more selected from the group consisting of $SiO_2$, $TiO_2$, $Al_2O_3$, $ZrO_2$, $SnO_2$, $CeO_2$, MgO, CaO, ZnO, $Y_2O_3$, $Pb(Zr,Ti)O_3$(PZT), $Pb_{1-x}La_xZr_{1-y}Ti_yO_3$(PLZT) where $0<x<1$ and $0<y<1$, $Pb(Mg_{1/3}Nb_{2/3})O_3$—$PbTiO_3$(PMN—PT), $BaTiO_3$, hafnia($HfO_2$), $SrTiO_3$, and a mixture of two or more thereof.

8. The method according to claim 7, wherein, in the pre-lithiating, the lithium-based solvent is one or more selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

9. The method according to claim 7, wherein, in the pre-lithiating, a current of 10 mA to 10 A is applied.

10. The method according to claim 7, wherein, in the pre-lithiating, current is applied for 0.1 hours to 12 hours.

11. The method according to claim 7, wherein the negative electrode current collector portion of the cutting comprises a lithium by-product layer formed through pre-lithiation reaction.

12. The method according to claim 7, wherein a process of stabilizing the metal sheet at 30° C. to 100° C. for 6 hours to 12 hours is further comprised between the pre-lithiating and the cutting.

13. The method according to claim 7, wherein, in the forming, connecting the negative electrode tabs to the negative electrode lead is performed by welding.

14. The method according to claim 13, wherein the welding is ultrasonic welding.

15. A device comprising the secondary battery according to claim 1 as a power source.

16. The device according to claim 15, wherein the device is one or more selected from a mobile phone, a portable computer, a smartphone, a smart pad, a netbook computer, a wearable device, a light electronic vehicle (LEV), a light electronic vehicle, a hybrid electric vehicle, a plug-in hybrid electric vehicle, and a power storage device.

* * * * *